United States Patent
Breau et al.

(10) Patent No.: US 8,014,292 B1
(45) Date of Patent: Sep. 6, 2011

(54) DYNAMIC LOCATION ROUTING PROTOCOL

(75) Inventors: Jeremy R. Breau, Leawood, KS (US); Pierce Gorman, Lee's Summit, MO (US); Mark A. Lipford, Leawood, KS (US); Patrick J. Melampy, Dunstable, MA (US); Hadriel Kaplan, Amherst, NH (US)

(73) Assignee: Sprint Communications Company L.P., Overland Park, KS (US)

( * ) Notice: Subject to any disclaimer, the term of this patent is extended or adjusted under 35 U.S.C. 154(b) by 176 days.

(21) Appl. No.: 12/416,732

(22) Filed: Apr. 1, 2009

(51) Int. Cl.
*H04L 1/00* (2006.01)

(52) U.S. Cl. ........ 370/238; 370/252; 370/389; 709/241; 709/242

(58) Field of Classification Search .......... 370/229–235, 370/237–238, 252–253, 351, 389, 392; 709/230–235, 238–243
See application file for complete search history.

(56) References Cited

U.S. PATENT DOCUMENTS

2009/0196183 A1 * 8/2009 Kakadia et al. ............... 370/237
* cited by examiner

*Primary Examiner* — Ricky Ngo
*Assistant Examiner* — Pao Sinkantarakorn

(57) ABSTRACT

Methods and computer-readable media are provided to select the optimal route for communicating a signaling message in a telecommunications networking environment. The method includes receiving a signaling message at a sending proxy that is responsible for sending the signaling message to its destination. To determine the best route, the sending proxy inspect its dynamic routing table to identify one or more potential routes that can be used to communicate the signaling message to its destination. The optimal route is determined by a numeric value, which may be based on one or more of a cost, the relationship between service providers, quality, or the like. Once the optimal route is determined, it is communicated from the sending proxy to the receiving proxy, often through one or more intermediary proxies.

18 Claims, 5 Drawing Sheets

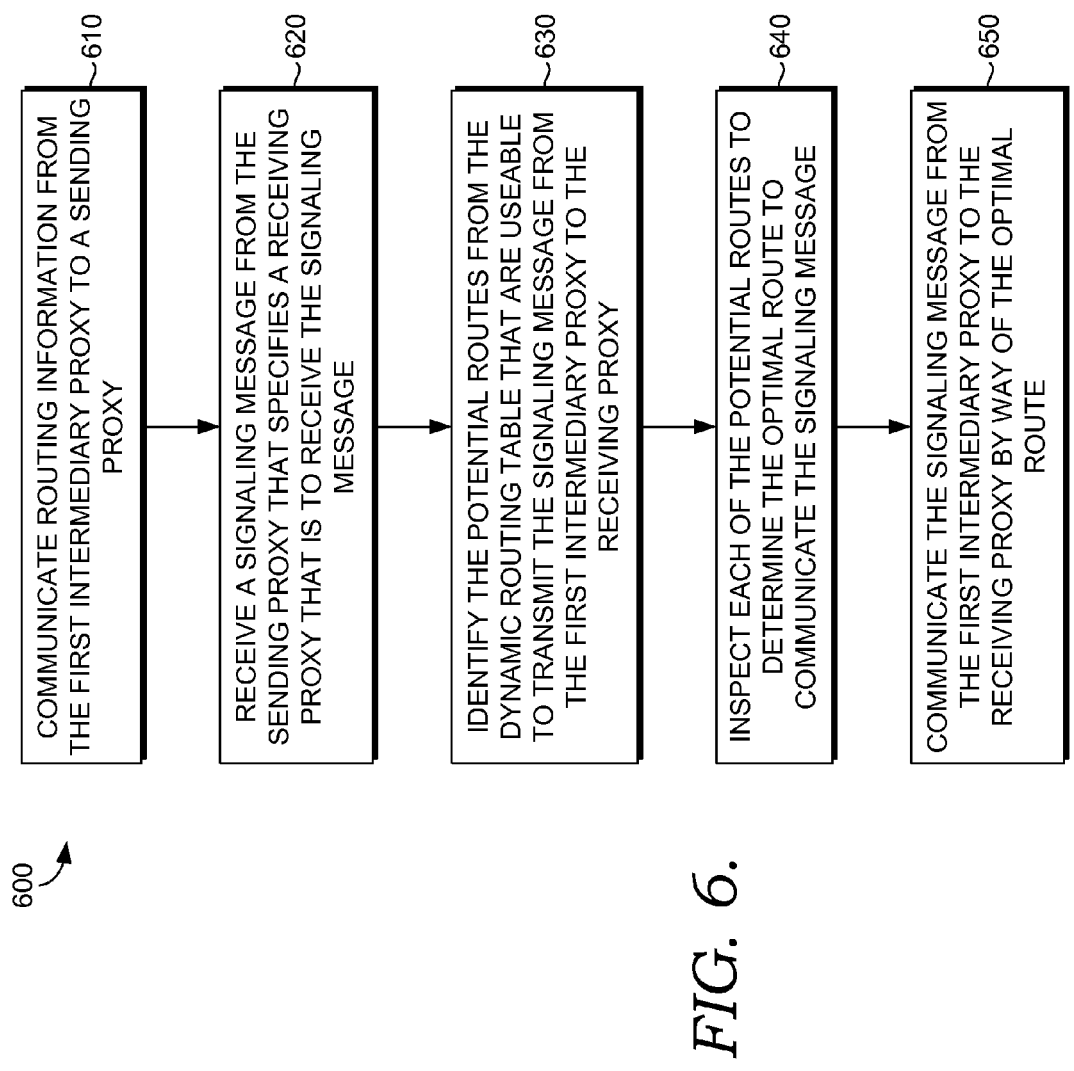

DYNAMIC LOCATION ROUTING PROTOCOL

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Embodiments of the present invention provide methods and computer-readable media for, among other things, determining the optimal route through which to send a signaling message such that a communications session using, for example, voice over Internet protocol (VoIP), can be established between a first mobile device and a second mobile device. To reduce post-dial delay, routing information is shared between adjacent proxies in different service providers' networks such that a dynamic routing table is constantly updated that provides an indication of the optimal route. While more than one potential route may be available, many factors may be evaluated to determine the optimal route, including, but not limited to, cost, reliability, the relationship between service providers, trust, quality, and the like. The present invention may be practiced and may apply to both wireline and wireless telecommunications network environments.

Accordingly, in one aspect, computer-readable media having computer-useable instructions embodied thereon that, when executed, cause a computing device to perform a method of determining an optimal route for communicating call-signaling information in a telecommunications networking environment, are provided. The method includes receiving a signaling message indicating that a communications session is to be established. The signaling message will be communicated from a sending proxy to a receiving proxy located, and may be located in different networks. Also, each of the sending proxy, the receiving proxy, and one or more intermediary proxies has a corresponding dynamic routing table that identifies potential routes through which the signaling message can be sent. The method further includes identifying from the dynamic routing table the potential routes that are useable to transmit the signaling message from the sending proxy to the receiving proxy. The potential routes are derived from routing information that was previously communicated to the sending proxy from the intermediary proxies. Additionally, the method includes determining an optimal route to communicate the signaling message. The optimal route is determined based on some or all of, a cost associated with communicating the signaling message across the intermediary proxies between the sending proxy and the receiving proxy; a relationship between various service providers in which the sending proxy, the receiving proxy, and the intermediary proxies are located; a time delay associated with communicating the signaling message between the sending proxy, the intermediary proxies, and the receiving proxy; packet loss; and quality. Lastly, the method includes communicating the signaling message from the sending proxy to the receiving proxy.

In another aspect, computer-readable media having computer-useable instructions embodied thereon that, when executed, cause a computing device to perform a method of determining an optimal route for communicating call-signaling information in a telecommunications networking environment, are provided. The method includes communicating routing information from a sending proxy to intermediary proxies that are located adjacent to the sending proxy, and receiving routing information from the intermediary proxies. The routing information allows the sending proxy to communicate the call-signaling information to the intermediary proxies. Further, the method includes receiving a signaling message indicating that a communications session is to be established, and that specifies a receiving proxy to which the signaling message is to be sent. Each of the sending proxy, the intermediary proxies, and the receiving proxy has a corresponding dynamic routing table that identifies potential routes through which the signaling message can be sent. Additionally, the method includes determining the optimal route for sending the signaling message. This determination is made by identifying the potential routes from the dynamic routing table that can be used to transmit the signaling message from the sending proxy to the receiving proxy, and by inspecting each of the potential routes to determine the optimal route. The optimal route is determined based on some or all of a cost associated with communicating the signaling message across the intermediary proxies between the sending proxy and the receiving proxy; a relationship between various service providers in which the sending proxy, the receiving proxy, and the intermediary proxies are located; a time delay associated with communicating the signaling message between the sending proxy, the intermediary proxies, and the receiving proxy; packet loss; and quality. The method further includes communicating the signaling message from the sending proxy to the receiving proxy by way of the optimal route.

In a further aspect, computer-readable media having computer-useable instructions embodied thereon that, when executed, cause a computing device to perform a method of determining an optimal route for communicating call-signaling information in a telecommunications networking environment, are provided. The method includes communicating routing information from a first intermediary proxy to a sending proxy. These proxies may be located within different networks. The routing information allows the sending proxy to communicate the call-signaling information to the first intermediary proxy. Further, the method includes receiving a signaling message from the sending proxy that specifies a receiving proxy that is to receive the signaling message. Each of the sending proxy, the first intermediary proxy, and the receiving proxy has a corresponding dynamic routing table that identifies one or more potential routes through which the signaling message can be sent. From the dynamic routing table corresponding to the first intermediary proxy, the method includes identifying the potential routes that are useable to transmit the signaling message from the first intermediary proxy to the receiving proxy. Additionally, the method includes inspecting each of the potential routes to determine the optimal route to communicate the signaling message, and communicating the signaling message from the first intermediary proxy to the receiving proxy.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 6 is an illustrative flowchart of another method for determining an optimal route for communicating call-signaling information in a telecommunications networking environment, according to an embodiment of the present invention.

DETAILED DESCRIPTION

The subject matter of the present invention is described with specificity herein to meet statutory requirements. Although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CD-ROM | Compact Disk Read Only Memory |
| DNS | Domain Name System |
| DVD | Digital Versatile Discs |
| ENUM | Electronic Numbering |
| FAX | Facsimile |
| IP | Internet Protocol |
| LAN | Local Area Network |
| LERG | Local Exchange Routing Guide |
| LNP | Local Number Portability |
| MGCP | Media Gateway Control Protocol |
| PDA | Personal Digital Assistant |
| RAM | Random Access Memory |
| ROM | Read Only Memory |
| SBC | Session Border Controller |
| SIP | Session Initiation Protocol |
| SLRP | Session Location Routing Protocol |
| TV | Television |
| URI | Uniform Resource Identifier |
| VoIP | Voice over Internet Protocol |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
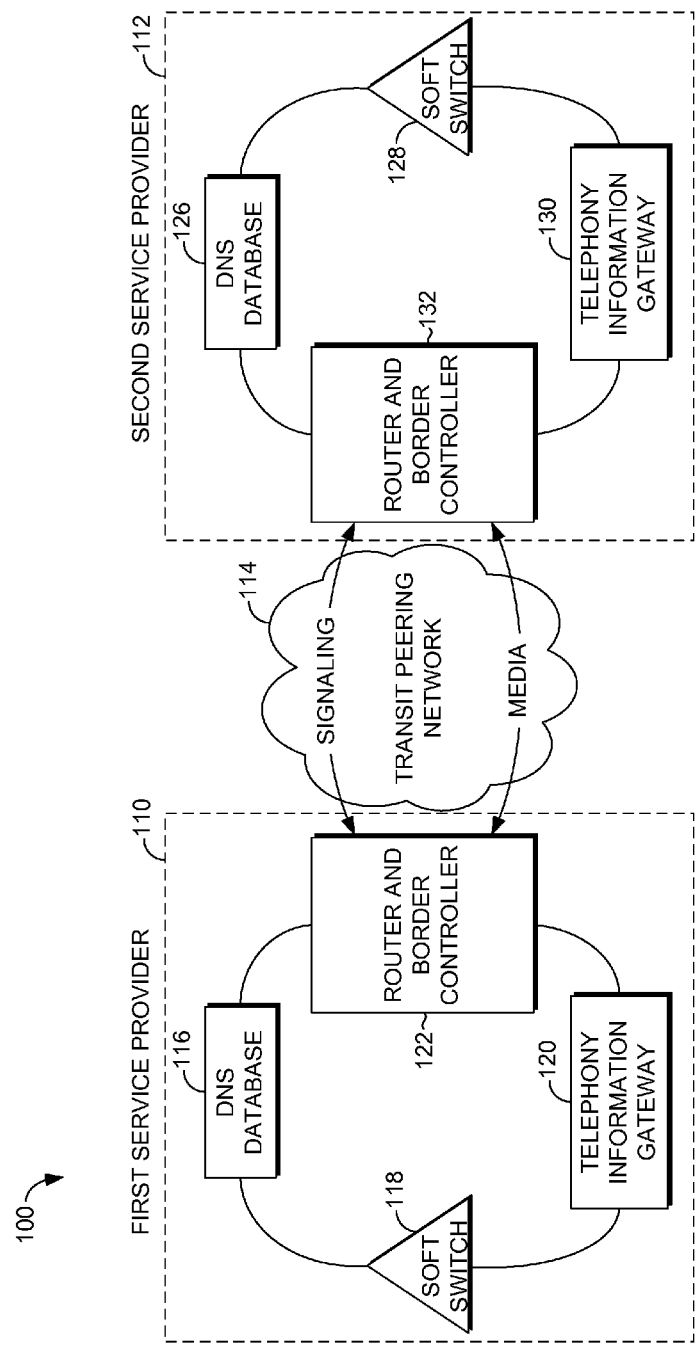
FIG. 1 is an exemplary network environment suitable for use in implementing embodiments of the present invention.

Referring to the drawings in general, and initially to FIG. 1 in particular, a schematic view of an exemplary communications environment 100 suitable for use in implementing embodiments of the present invention is illustrated. Various communication protocols, such as voice over Internet protocol (VoIP), require both a signaling and a media protocol. VoIP is a phone call that is transmitted over a data network, such as the Internet. The Internet protocol includes many protocols and technology used for encoding a voice call, allowing for the voice call to be slotted in between data calls on a data network, which may include the public Internet, corporate intranet, or a managed network used by long distance and international traditional providers VoIP, for instance, may use a variety of signaling protocols, such as H.323, Media Gateway Control Protocol (MGCP), or Session Initiation Protocol (SIP).

SIP is the Application Layer protocol for the establishment, modification, and termination of conferencing and telephony sessions over IP-based networks, and uses text-based messages, much like HTTP. Further, SIP is a standard for setting up telephone calls, multimedia conferencing, instant messaging, and other types of real-time communications on the Internet. SIP can establish sessions for features such as audio/video conferencing, interactive gaming, and call forwarding to be deployed over IP networks. Thus, SIP may enable service providers to integrate basic IP telephony services with Web, email, and chat services. A user of a first mobile device may wish to communicate using VoIP, for example, with a user of a second mobile device. In one instance, the two mobile devices may be located within a single service provider's network. In another instance, however, the mobile devices may be located within different networks that are associated with different service providers, and thus determining the best way to send a signaling message from the first network to the second network may present more of a challenge. The signaling message may have to travel across one or more networks to its destination.

Currently, communicating a signaling message from one network to another is possible, but many problems exist. The main problem is post-dial delay, such that each proxy within each network must perform a lookup (e.g., in an electronic numbering (ENUM) database) to determine the IP address of the next proxy to which the signaling message is being sent. This is done until the signaling message reaches its destination. Generally, ENUM unifies traditional telephony and next-generation IP networks, and involves the process of creating a domain name from a telephone number, and subsequently resolving it to an Internet address (e.g., a uniform resource identifier (URI)) using DNS technology.

With continued reference to FIG. 1, a first service provider 110 and a second service provider 112 are illustrated, each including separate processes used to send and receive signaling and media messages back and forth. The illustrated components provide a method to load telephony routing information associated with multiple service providers or carriers in a database, and expose the information through the internetwork of session border controllers (SBCs) using a protocol (e.g., Session Location Routing Protocol (SLRP)). First service provider 110 includes a DNS database 116, a soft switch 118, a telephony information gateway 120, and a router and border controller 122. Similarly, second service provider 112 includes a DNS database 126, a soft switch 128, a telephony information gateway 130, and a router and border controller 132. In between the two service provider networks is a transit peering network 114 that allows for signaling and media messages to be sent between the first service provider and the second service provider. While the transit peering network 114 is illustrated in FIG. 1 as one network, it is contemplated to be within the scope of the present invention that two or more separate networks may be used to accomplish the same purpose.

As mentioned, telephony information for each service provider is downloaded or otherwise sent to a SIP registry, which may include a DNS database (e.g., DNS database 116 and 126) and a telephony information gateway (e.g. telephony information gateway 120 and 130). The telephony information gateway typically provides access to external commercial standard telephony routing databases, such as the Local Exchange Routing Guide (LERG) and the Local Number Portability (LNP) database. Soft switch 118 may query the DNS database 116 to determine telephony information for the other carriers, including telephone numbers and IP addresses. Generally, soft switches, such as soft switch 118 and 128 are able to control connection services for a media gateway and/or native IP endpoints, select processes that can be applied to a call, provide routing for a call within the network based on signaling and customer database information, transfer control of the call to another network element, and interface to and support management functions such as provisioning, fault, billing, etc. A soft switch, in one embodiment, is a media gateway controller.

Telephony information gateway 120 may send a domain-based telephony route advertisement to the router and border controller 122, which then forwards this routing information to other networks, such as adjacent networks and associated proxies. This allows for the networks to have information for each other prior to any calls being made. As will be discussed in more detail below, this routing information is updated in real-time, and thus the information in the databases is dynamic, being updated as soon as a change is made.

Generally, the router and border controllers 122 and 132 control the signaling and media messages sent through the transit peering network 114 to the first service provider 110 and the second service provider 112. In one embodiment, the router and border controllers 122 and 132 may be one combined component, as shown in FIG. 1. In another embodiment, however, they may be separate components, such as a separate router and a separate border controller. Further, the router may be a domain-based router (DBR), and the border controller may be a session border controller (SBC). In yet another embodiment, the signaling and media messages may use separate SBCs, and thus there may be two separate SBCs associated with each service provider.

Figure 2:
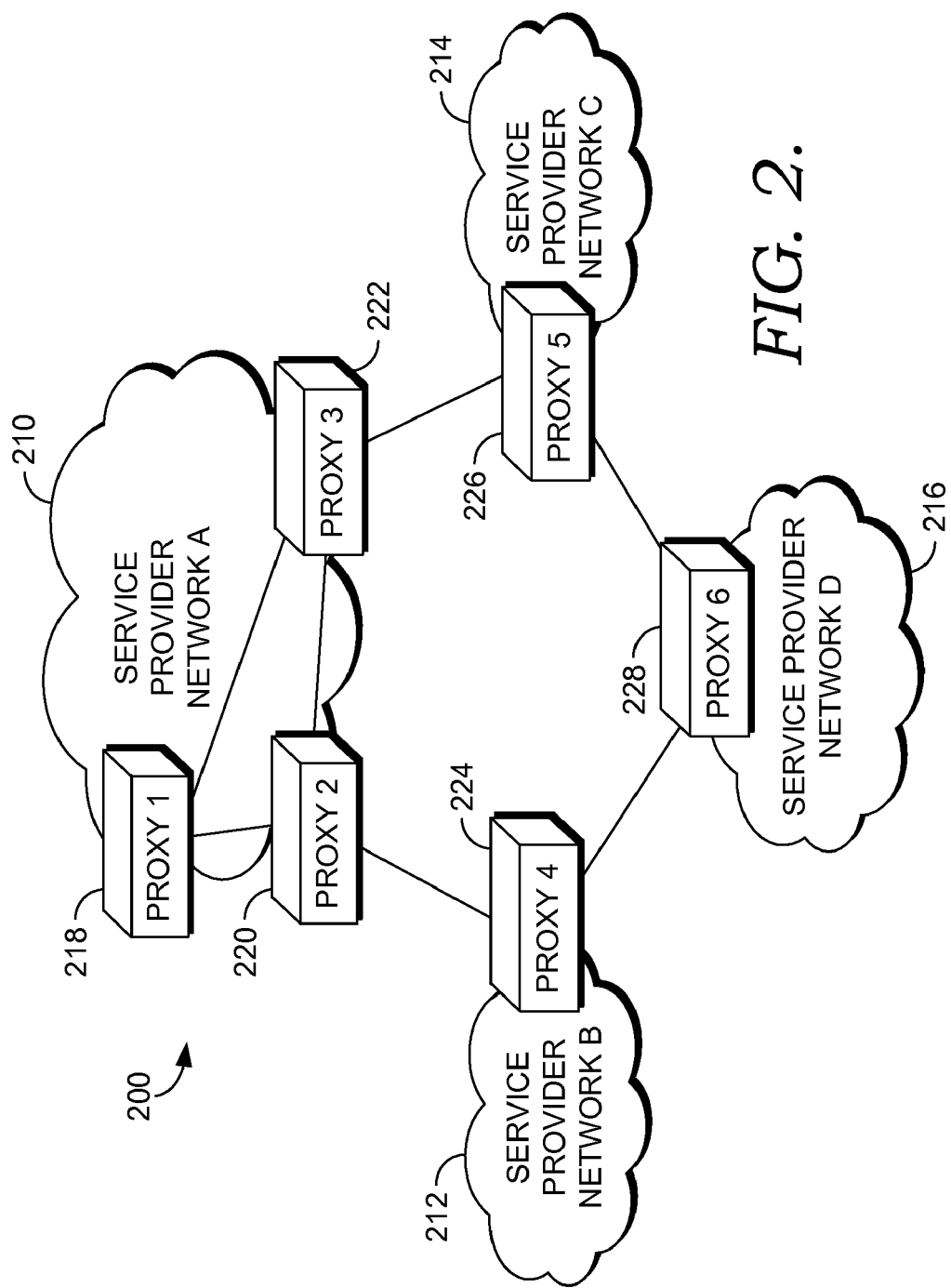
FIG. 2 is a schematic view of an exemplary communications environment suitable for use in implementing embodiments of the present invention.

Referring now to FIG. 2, a schematic view of an exemplary communications environment 200 is shown that is suitable for use in implementing embodiments of the present invention. Initially, various service provider networks and proxies are illustrated, and are shown as being connected such that a signaling message can be communicated from one service provider network to another, or more specifically, from one proxy to another. The service provider networks include service provider network A 210 (hereinafter "network A"), service provider network B 212 (hereinafter "network B"), service provider network C 214 (hereinafter "network C"), and service provider network D 216 (hereinafter "network D"). The proxies shown include proxy 1 218, proxy 2 220, proxy 3 222, proxy 4 224, proxy 5 226, and proxy 6 228. Each proxy corresponds to a particular service provider network, and is shown in FIG. 2.

A proxy handles routing of SIP signaling, but it does not initiate SIP messages. The most important task of a proxy is to route session invitations closer to the callee from the caller. A signaling message to be sent from proxy 1 218 to proxy 2 220, for example, is sent within a single service provider network, or network A 210. Sending signaling messages across one or more different service provider networks, however, can be more challenging. For instance, a signaling message that is to be sent from proxy 1 to proxy 6 must leave network A 210, enter network B 212, and enter network D 216.

Figure 3:
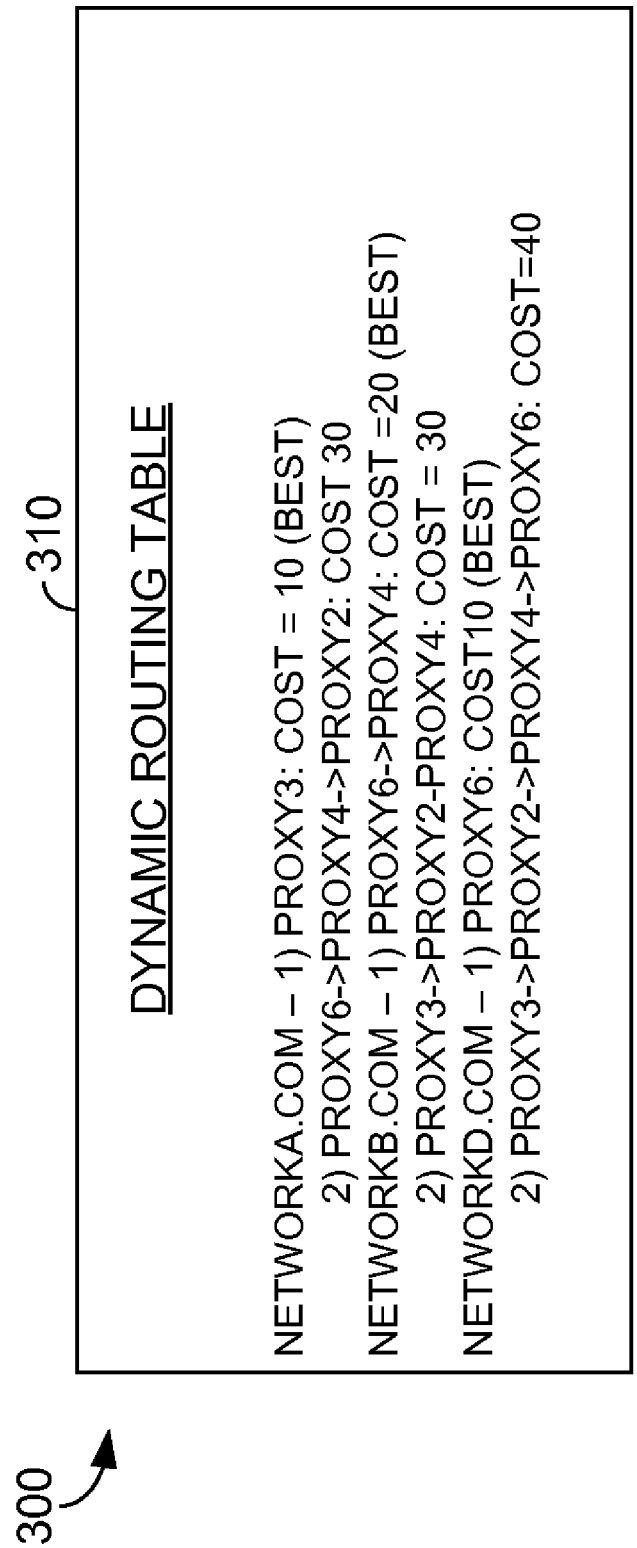
FIG. 3 is an exemplary dynamic routing table that provides potential routes for communicating a signaling message from one proxy to another.

Each service provider network also includes a corresponding dynamic routing table, which is illustrated in FIG. 3. The dynamic routing table 300 provides potential routes for communicating a signaling message from one proxy to another. The dynamic routing table 310 illustrated in FIG. 3 corresponds to network C 214 in FIG. 2. To fully illustrate an example, the dynamic routing table 310 will be used in conjunction with FIG. 2. In one embodiment, a signaling message is initially located within service provider network C 214. As shown, network C 214 has just one proxy, and that is proxy 5 226. In one instance of this embodiment, the signaling message is to be sent from network C 214 to network B 212. There are multiple routes that may be taken to communicate the signaling message. As previously discussed, telephony information for other service providers, such as adjacent service providers, have already been communicated such that proxy 5 226 can ascertain telephony information for both proxy 6 228 and proxy 3 222, even though both are in different service provider networks than proxy 5 226.

In order to determine the optimal route, the dynamic routing table 310 is inspected. The dynamic routing table 310 includes potential routes that allow the signaling message to arrive at network A 210, network B 212, and network D 216. Here, two options are illustrated that can be used to communicate the signaling message from network C to network B. The dynamic routing table 310 indicates that the signaling message may be sent to proxy 6 228, and then to proxy 4 224. Alternatively, the signaling message may be sent to proxy 3 222, to proxy 2 220, and then to proxy 4 224. It should be noted that the dynamic routing table 310 is internal to network C 214, and is not an external database. This is one reason why post-dial delay is reduced, as it is not necessary to query an external database for telephony information, such as IP addresses for adjacent proxies.

Selecting the optimal route may take into account many factors including, but not limited to, the relationship between various service providers, trust, cost, quality (e.g., delay, packet loss, jitter), congestion, link/path failure, or requirements imposed by different proxies (e.g., some proxies have more stringent requirements than others). Service providers establish relationships with each other, and thus if there is a good relationship, there is a better chance that telephony information is exchanged and that there is trust between the service providers. Information such as telephone numbers and IP addresses are exchanged between service providers. In one instance, a service provider may not want to associate with one or more proxies located within other service providers' networks. and thus may choose not to publish or send its telephony information to those other service providers' networks. Further, a certain service provider may want to associate with another service provider, but instead of not sharing any information, may choose to share limited information with that service provider. This allows for a controlled sharing of routing information. In one instance, proxy 1 218 may share more or different information with proxy 2 220 and proxy 3 222, as all three proxies are within the same network, which is network A 210. Less or different information may be shared with proxies outside of network A 210.

Service providers may choose how much to charge other service providers for sending messages through them, and thus cost is a factor, and sometimes the most important factor in determining the best route to select to reach a receiving proxy. Various factors such as delay in sending the message, packet loss, and jitter also effect the optimal path. Jitter is variability in latency, or delay. If a network provides varying levels of latency, such as different waiting times, for different packets or cells, jitter is introduced. Other factors will become apparent.

As shown in the dynamic routing table 310, each potential route is associated with a numeric value. This numeric value may be associated with one or more of the factors that have been previously discussed. For instance, the numerical value, in one embodiment, is based solely on the cost of sending the signaling message to a particular proxy. In another embodiment, the numeric takes into consideration not only the cost, but other factors, such as the relationship between various service providers, trust, quality (e.g., delay, packet loss, jitter), congestion, and link/path failure. When combined, a comparison of the numeric value assigned to each potential route allows for the selection of the optimal route. In one instance, the greater the numerical value, the better the route, but in another instance, the lower the numerical value, the better the route. Returning to the example given above, the assigned numeric values are based on cost, and therefore the lower the cost, the better the route. The first route, from proxy 6 to proxy 4 has a cost of 20, and the second route, from proxy 3 to proxy 2 to proxy 4 has a cost of 30. Therefore, the optimal route in this example is the first route, with a cost of 20. Here, the signaling message will be sent, at least initially, using the first route, as the cost is less than the other option.

In one embodiment, if the signaling message must travel through one or more proxies, such as intermediary proxies, prior to reaching the receiving proxy, each proxy encountered may perform the process described above, and inspect its dynamic routing table to determine the best route from that proxy to the receiving proxy. Returning to the previous example, the optimal route from network C 214 is to go through proxy 6 228 to proxy 4 224, the receiving proxy. Once the signaling message reaches proxy 6 228, proxy 6 228 may inspect its dynamic routing table, which is different from the dynamic routing table 310, as it corresponds to network D, not to network C. The dynamic routing table for proxy 6 228 will indicate the optimal route from proxy 6 228 to proxy 4 224. While proxy 4 224 is adjacent to proxy 6 228, the optimal route may be to communicate the signaling message directly from proxy 6 228 to proxy 4 224. This may, however, not be the optimal route in some circumstances. For instance, if network D and network B do not have a relationship and have not previously shared their telephony information with each other, the signaling message may not be able to be sent directly from proxy 6 228 to proxy 4 224.

Importantly, the dynamic routing tables that correspond to each network are, in one embodiment, dynamic, such that they are updated in real-time, or near real-time, and information in the tables changes at any time with a change of any of the factors that have been previously discussed. For instance, a particular proxy may become unavailable or busy, and signaling messages may not be able to be communicated through that proxy for a certain amount of time. Or, a particular proxy may stop advertising or sending its telephony information to other networks or proxies. In either of these circumstances, that proxy may drop out of the other tables belonging to the other proxies, and an alternate route would be chosen. The signaling message would likely still be able to reach its destination using an alternate route. To continue with the example above, when proxy 6 228 inspects its dynamic routing table, if proxy 4 224 is unavailable for some reason, it may not even show up in the table corresponding to proxy 6 228, and the signaling message may be sent back to proxy 5 226 so that an alternate route could be found.

Another example of the importance of the tables being dynamic is that in one instance, a service provider may wish to induce more traffic onto its network to charge associated tolls and make more money, or it may have additional bandwidth that it can use. This service provider may lower costs of transmitting signaling messages to effect the overall topology, which will modify the flow of SIP messages sent across various networks.

Figures 4, 5:
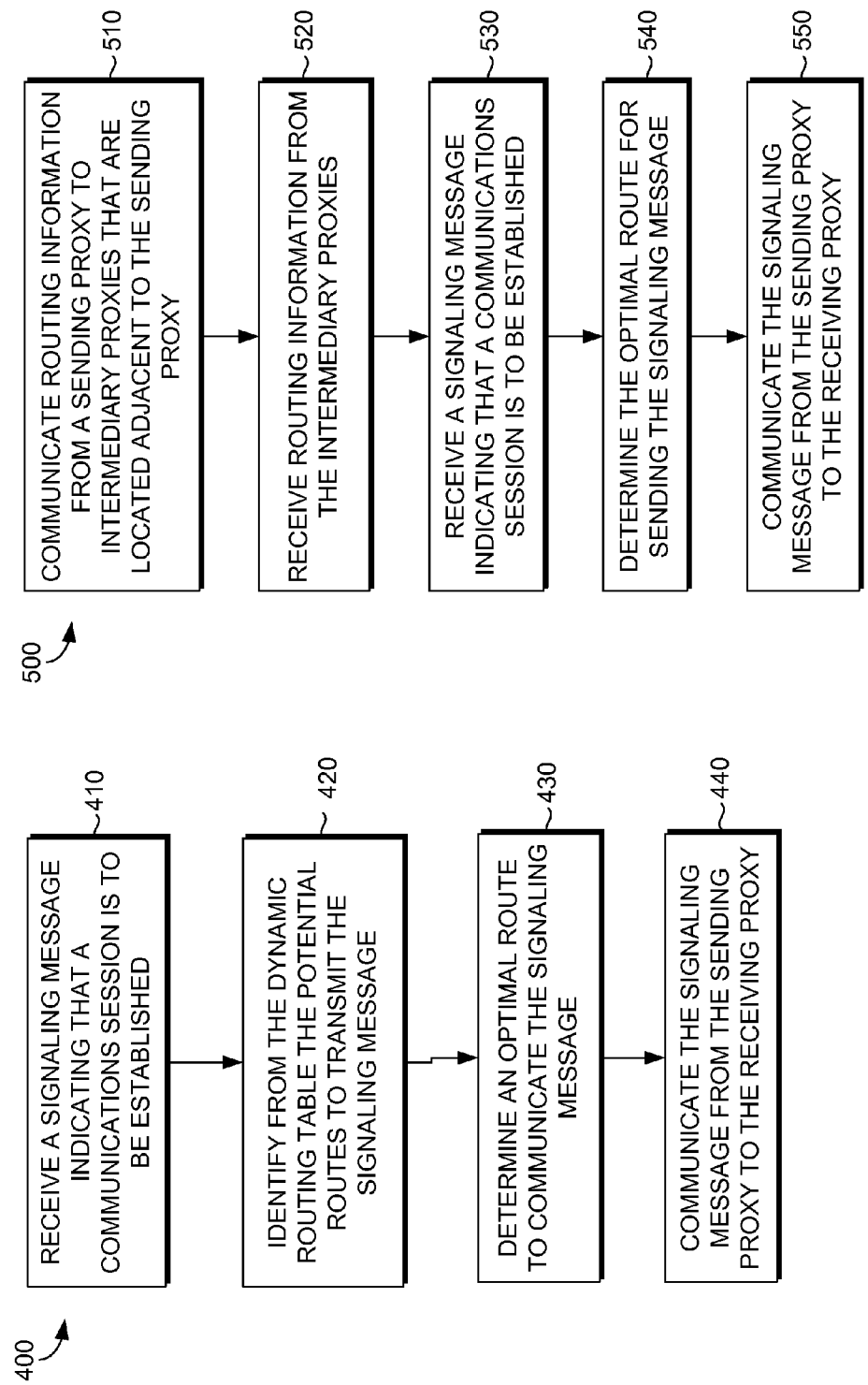
FIG. 4 is an illustrative flowchart of a method for determining an optimal route for communicating call-signaling information in a telecommunications networking environment, according to an embodiment of the present invention.
FIG. 5 is an illustrative flowchart of another method for determining an optimal route for communicating call-signaling information in a telecommunications networking environment, according to an embodiment of the present invention.

Turning to FIG. 4, an illustrative flowchart is shown of a method 400 for determining an optimal route for communicating call-signaling information in a telecommunications networking environment, according to an embodiment of the present invention. Initially, at step 410 a signaling message is received indicating that a communications session is to be established between a first mobile device (e.g., the caller) and a second mobile device (e.g., the callee). A signaling message is used to set up and tear down calls. The signaling message may be communicated from a sending proxy such as the proxy that first receives the message, and that is located within a first service provider's network, to a receiving proxy that is located within a second service provider's network. It is contemplated that a signaling message may also be sent from one proxy to another within the same service provider's network. Further, each of the sending proxy, the receiving proxy, and one or more intermediary proxies has a corresponding dynamic routing table, such as was discussed above in FIGS. 2 and 3. The dynamic routing table identifies one or more potential routes through which the signaling message can be sent.

As previously discussed, the dynamic routing tables, in one embodiment, are dynamic, and therefore are updated when any information regarding the networks or the relationship between networks changes. Many factors may influence the information in the dynamic routing tables, including the relationship between various service providers, trust, cost, quality (e.g., delay, packet loss, jitter), congestion, link/path failure, or requirements imposed by different proxies (e.g., some proxies have more stringent requirements than others). In one instance, if a proxy becomes unavailable, it may be removed from the dynamic routing tables, as it is not possible at that time to route the signaling message through that particular proxy. Other scenarios that would effect the information in the tables will also become apparent.

Further, each potential route in the dynamic routing tables may have an associated numeric value that assists in determining the optimal route for the signaling message to reach its destination. This numeric value may be based on a cost of sending the signaling message through the proposed route, or may be based on other factors, including a combination of factors listed above, including the cost. In one instance, a particular service provider may decide to lower its cost to route signaling messages in order to incur more traffic. If cost is a factor that influences the numeric value in a dynamic routing table, the table would then be updated to take the lower cost into account.

At step 420, the potential routes that are used to transmit the signaling message from the sending proxy to the receiving proxy are identified from the dynamic routing table. As mentioned, the potential routes are derived from routing information that was previously communicated to the sending proxy from the one or more intermediary proxies that are adjacently located to the sending proxy. In this embodiment, adjacent proxies share their routing information with each other, which may include telephone numbers and IP addresses. As the information is shared prior to calls being made, post-dial delay may be significantly reduced.

An optimal route is determined at step 430. The optimal route is used to communicate the signaling message, and may be based on one or more of many factors, as previously mentioned. These factors include a cost associated with communicating the signaling message across the intermediary proxy(ies) between the sending proxy and the receiving proxy; a relationship between various service providers in which the sending proxy, the receiving proxy, and the one or more intermediary proxies are located; time delay associated with communicating the signaling message between the sending proxy, the intermediary proxy(ies), and the receiving proxy; packet loss; and quality. Further, the signaling message is communicated at step 440 from the sending proxy to the receiving proxy by way of the optimal route.

As previously discussed, if the signaling message must travel through one or more intermediary proxies prior to reaching the receiving proxy, each proxy between the sending and receiving proxies may perform the process described above, and inspect its dynamic routing table to determine the best route from that proxy to the receiving proxy. As the dynamic routing tables are dynamic, the information may change at any given time (e.g., a proxy becomes unavailable). Also, for example, certain networks may have better relationships, and therefore trust, with each other than other networks, and therefore if a dynamic routing table is inspected for each proxy through which the signaling message is sent, the optimal route can be found, and may change at each proxy.

As such, once a signaling message may be sent from the sending proxy to a first adjacent proxy, this proxy may identify from its corresponding dynamic routing table one or more potential routes that are useable to transmit the signaling message from the first adjacent proxy to the receiving proxy. The optimal route is determined, and it may be the same or different than the optimal route selected from the dynamic routing table associated with the sending proxy The signaling message is then communicated from the first adjacent proxy to a second adjacent proxy, based on the selected optimal route. The second adjacent proxy performs the same identification of an optimal route by inspecting its dynamic routing table, and based on that, the signaling message is sent from the second adjacent proxy to the receiving proxy. In one embodiment, each proxy is located within a different service provider's network, but in another embodiment, one or more of the proxies (e.g., sending proxy, first adjacent proxy, second adjacent proxy, receiving proxy) are located within the same service provider's network.

FIG. 5 is an illustrative flowchart of a method 500 for determining an optimal route for communicating call-signaling information in a telecommunications networking environment, according to an embodiment of the present invention. At step 510, routing information is communicated from a sending proxy to one or more intermediary proxies that are located adjacent to the sending proxy. This routing information may include telephony information, such as telephone numbers and IP addresses. The routing information is received at step 520 from the intermediary proxies such that the routing information allows the sending proxy to communicate the call-signaling information to the intermediary proxies. At step 530, a signaling message is received indicating that a communications session is to be established between a first mobile device (e.g., a caller) and a second mobile device (e.g., a callee). The signaling message specifies a receiving proxy to which the signaling message is to be sent. Additionally, the sending proxy, intermediary proxies, and the receiving proxy each has a corresponding dynamic routing table that identifies one or more potential routes through which the signaling message can be sent.

At step 540, the optimal route for sending the signaling message is determined. The optimal route may be determined by identifying potential routes from the dynamic routing table corresponding to the sending proxy that can be used to transmit the signaling message from the sending proxy to the receiving proxy. The potential routes may be inspected to determine the optimal route, which may be based on one or more factors. These factors include, but are not limited to, a cost associated with communicating the signaling message across the intermediary proxy(ies) between the sending proxy and the receiving proxy; a relationship between various service providers in which the sending proxy, the receiving proxy, and the one or more intermediary proxies are located; time delay associated with communicating the signaling message between the sending proxy, the intermediary proxy(ies), and the receiving proxy; packet loss; and quality.

Lastly, the signaling message is communicated from the sending proxy to the receiving proxy at step 550 by way of the optimal route. As mentioned, the proxies may be located within the same or different networks. For instance, the sending proxy may be located within a first service provider's network, and the receiving proxy may be located within a second service provider's network.

As mentioned, each proxy through which a signaling message is sent may inspect its own dynamic routing table to determine the optimal route from that proxy to the receiving proxy, or the destination of the signaling message. In one embodiment, the signaling message may be communicated from the sending proxy to a first adjacent proxy that is identified in the optimal route, and the first adjacent proxy may identify from its dynamic routing table one or more potential routes that can be used to transmit the signaling message from the first adjacent proxy to the receiving proxy. The optimal route can then be determined, and the signaling message may then be sent from the first adjacent proxy to the receiving proxy by way of the optimal route.

Referring to FIG. 6, an illustrative flowchart is shown of a method 600 for determining an optimal route for communicating call-signaling information in a telecommunications networking environment, according to an embodiment of the present invention. It should be noted that while the discussions of FIG. 4 and FIG. 5 were from the sending proxy's point of view, the discussion of FIG. 6 is from an intermediary proxy's point of view. Initially, routing information from a first intermediary proxy located within a first service provider's network is communicated to a sending proxy, which is located within a second service provider's network. This is shown at step 610. The routing information allows the sending proxy to communicate the call-signaling information to the first intermediary proxy.

At step 620, a signaling message is received from the sending proxy that specifies a receiving proxy that is to receive the signaling messages in order to establish a communications session between a first mobile device and a second mobile device. Each of the sending proxy, the first intermediary proxy, and the receiving proxy has a corresponding dynamic routing table that identifies one or more potential routes through which the signaling message can be sent. The dynamic nature of these tables has been described in detail herein.

From the dynamic routing table corresponding to the first intermediary proxy, one or more potential routes are identified at step 630. These routes are used to communicate or transmit the signaling message from the first intermediary proxy to the receiving proxy. Each of these potential routes are inspected at step 640 to determine the optimal route to communicate the signaling message. As previously discussed, the optimal route may be determined based on one or more of many factors, including, but not limited to, a cost associated with communicating the signaling message across the intermediary proxy(ies) between the sending proxy and the receiving proxy; a relationship between various service providers in which the sending proxy, the receiving proxy, and the one or more intermediary proxies are located; time delay associated with communicating the signaling message between the sending proxy, the intermediary proxy(ies), and the receiving proxy; packet loss; and quality. At step 650, the signaling message is communicated from the first intermediary proxy to the receiving proxy by way of the optimal route.

In one embodiment, a second intermediary proxy may be located between the first intermediary proxy and the receiving proxy. In this instance, the second intermediary proxy may determine, prior to communicating the signaling message to the receiving proxy, the optimal route to communicate the signaling message to the receiving proxy. This may be determined from the dynamic routing table that corresponds to the second intermediary proxy.

While embodiments have been described as sending a signaling message from a sending proxy to a receiving proxy, once received by the receiving proxy, the receiving proxy may send the message back to the sending proxy. In this case, the first intermediary proxy, for instance, may need routing information for the sending proxy so that an association or relationship is established between the two proxies, as well as other adjacent proxies. Having this information allows the first intermediary proxy to have the capability of communicating the call-signaling information to the sending proxy.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-useable instructions embodied thereon that, when executed, cause a computing device to perform a method of determining an optimal route for communicating call-signaling information in a telecommunications networking environment, the method comprising:
   receiving a signaling message indicating that a communications session is to be established between a first mobile device and a second mobile device,
   (1) wherein the signaling message will be communicated from a sending proxy located within a first service provider's network to a receiving proxy located within a second service provider's network, and
   (2) wherein each of the sending proxy, the receiving proxy, and one or more intermediary proxies has a corresponding dynamic routing table that identifies one or more potential routes through which the signaling message can be sent;
   from the dynamic routing table corresponding to the sending proxy, identifying the one or more potential routes that are useable to transmit the signaling message from the sending proxy to the receiving proxy, wherein the one or more potential routes are derived from routing information that was previously communicated to the sending proxy from the one or more intermediary proxies that are adjacently located to the sending proxy;
   determining an optimal route from the sending proxy to the receiving proxy to communicate the signaling message, wherein the optimal route is determined based on one or more of,
   (1) a cost associated with communicating the signaling message across the one or more intermediary proxies between the sending proxy and the receiving proxy,
   (2) a relationship between various service providers in which the sending proxy, the receiving proxy, and the one or more intermediary proxies are located,
   (3) a time delay associated with communicating the signaling message between the sending proxy, the one or more intermediary proxies, and the receiving proxy,
   (4) packet loss, and
   (5) quality; and
   communicating the signaling message from the sending proxy to a first adjacent proxy identified in the optimal route from the sending proxy to the receiving proxy, where the first adjacent proxy accesses its corresponding dynamic routing table to determine the optimal route from the first adjacent proxy to the receiving proxy.

2. The media of claim 1, wherein each of the one or more intermediary proxies receives routing information from adjacently located proxies.

3. The media of claim 1, wherein the optimal route is determined to communicate the signaling message from the first adjacent proxy to the receiving proxy.

4. The media of claim 3, wherein based on the optimal route, the first adjacent proxy communicates the signaling message to a second adjacent proxy.

5. The media of claim 4, wherein the second adjacent proxy identifies from the corresponding dynamic routing table the optimal route to communicate the signaling message from the second adjacent proxy to the receiving proxy.

6. The media of claim 5, wherein, based on the optimal route, the second adjacent proxy communicates the signaling message to the receiving proxy.

7. The media of claim 4, wherein the second adjacent proxy is located within a different service provider's network than the sending proxy, the receiving proxy, and the first adjacent proxy.

8. The media of claim 1, wherein the first adjacent proxy is located within a different service provider's network than the sending proxy and the receiving proxy.

9. The media of claim 1, wherein the routing information further includes one or more IP addresses associated with the sending proxy and information about the first service provider's network.

10. Non-transitory computer-readable media having computer-useable instructions embodied thereon that, when executed, cause a computing device to perform a method of determining an optimal route for communicating call-signaling information in a telecommunications networking environment, the method comprising:
communicating routing information from a sending proxy to one or more intermediary proxies that are located adjacent to the sending proxy;
receiving routing information from the one or more intermediary proxies, wherein the routing information allows the sending proxy to communicate the call-signaling information to the one or more intermediary proxies;
receiving a signaling message indicating that a communications session is to be established between a first mobile device and a second mobile device, and that specifies a receiving proxy to which the signaling message is to be sent, wherein each of the sending proxy, the one or more intermediary proxies, and the receiving proxy has a corresponding dynamic routing table that identifies one or more potential routes through which the signaling message can be sent;
determining the optimal route for sending the signaling message, wherein the determining includes,
(1) from the dynamic routing table corresponding to the sending proxy, identifying the one or more potential routes that are useable to transmit the signaling message from the sending proxy to the receiving proxy, and
(2) inspecting each of the one or more potential routes to determine the optimal route to communicate the signaling message, wherein the optimal route is determined based on one or more of,
(a) a cost associated with communicating the signaling message across the one or more intermediary proxies between the sending proxy and the receiving proxy,
(b) a relationship between various service providers in which the sending proxy, the receiving proxy, and the one or more intermediary proxies are located,
(c) a time delay associated with communicating the signaling message between the sending proxy, the one or more intermediary proxies, and the receiving proxy,
(d) packet loss, and
(e) quality; and
communicating the signaling message from the sending proxy to the receiving proxy by way of the optimal route from the sending proxy to the receiving proxy, wherein each intermediary proxy to which the signaling message is communicated determines the optimal route from that particular intermediary proxy to the receiving proxy.

11. The media of claim 10, wherein the sending proxy is located within a first service provider's network, and the receiving proxy is located within a second service provider's network.

12. The media of claim 10, wherein the optimal route is determined to communicate the signaling message from the first adjacent proxy to the receiving proxy.

13. The media of claim 12, further comprising communicating the signaling message from the first adjacent proxy to the receiving proxy by way of the optimal route.

14. Non-transitory computer-readable media having computer-useable instructions embodied thereon that, when executed, cause a computing device to perform a method of determining an optimal route for communicating call-signaling information in a telecommunications networking environment, the method comprising:
communicating routing information from a first intermediary proxy located within a first service provider's network to a sending proxy located within a second service provider's network, wherein the routing information allows the sending proxy to communicate the call-signaling information to the first intermediary proxy;
receiving a signaling message from the sending proxy that specifies a receiving proxy that is to receive the signaling message, wherein each of the sending proxy, the first intermediary proxy, and the receiving proxy has a corresponding dynamic routing table that identifies one or more potential routes through which the signaling message can be sent;
from the dynamic routing table corresponding to the first intermediary proxy, identifying the one or more potential routes that are useable to transmit the signaling message from the first intermediary proxy to the receiving proxy;
inspecting each of the one or more potential routes to determine the optimal route to communicate the signaling message; and
communicating the signaling message from the first intermediary proxy to the receiving proxy by way of the optimal route.

15. The media of claim 14, further comprising:
communicating the signaling message from the first intermediary proxy to a second intermediary proxy by way of the optimal route, wherein the second intermediary proxy determines from the dynamic routing table corresponding to the second intermediary proxy the optimal route to communicate the signaling message to the receiving proxy; and
communicating the signaling message from the second intermediary proxy to the receiving proxy by way of the optimal route.

16. The media of claim 14, further comprising receiving routing information from the sending proxy to the first intermediary proxy allowing for the first intermediary proxy to have the capability of communicating the call-signaling information to the sending proxy.

17. The media of claim 14, wherein the optimal route is determined based upon one or more of,
a cost associated with communicating the signaling message across one or more intermediary proxies between the sending proxy and the receiving proxy,
a relationship between various service providers in which the sending proxy, the receiving proxy, and the one or more intermediary proxies are located,
a time delay associated with communicating the signaling message between the sending proxy, the one or more intermediary proxies, and the receiving proxy,
packet loss, or
quality.

18. The media of claim 14, wherein the signaling message indicates that a communications session is to be established between a first mobile device and a second mobile device.

* * * * *